US009414358B2

(12) United States Patent
Piggin et al.

(10) Patent No.: US 9,414,358 B2
(45) Date of Patent: Aug. 9, 2016

(54) COMMUNICATION UNITS AND METHODS FOR CONTROL CHANGE NOTIFICATION IN BROADCAST COMMUNICATION

(75) Inventors: Paul Piggin, Wiltshire (GB); Peter Darwood, Bristol (GB)

(73) Assignee: SCA IPLA HOLDINGS INC, New York, NY (US)

( * ) Notice: Subject to any disclaimer, the term of this patent is extended or adjusted under 35 U.S.C. 154(b) by 132 days.

(21) Appl. No.: 14/000,297

(22) PCT Filed: Feb. 17, 2012

(86) PCT No.: PCT/GB2012/050367
§ 371 (c)(1),
(2), (4) Date: Oct. 23, 2013

(87) PCT Pub. No.: WO2012/110830
PCT Pub. Date: Aug. 23, 2012

(65) Prior Publication Data
US 2014/0044072 A1    Feb. 13, 2014

(30) Foreign Application Priority Data
Feb. 18, 2011    (GB) .................................. 1102891.7

(51) Int. Cl.
| H04W 4/00 | (2009.01) |
| H04W 72/00 | (2009.01) |
| H04W 48/12 | (2009.01) |
| H04W 72/04 | (2009.01) |

(52) U.S. Cl.
CPC ............ *H04W 72/005* (2013.01); *H04W 48/12* (2013.01); *H04W 72/042* (2013.01)

(58) Field of Classification Search
None
See application file for complete search history.

(56) References Cited

U.S. PATENT DOCUMENTS

| 8,467,329 B2* | 6/2013 | Lee et al. ...................... 370/312 |
| 2005/0195852 A1* | 9/2005 | Vayanos ............... H04W 48/12 370/437 |
| 2006/0029066 A1* | 2/2006 | Jeong et al. ................... 370/389 |

(Continued)

FOREIGN PATENT DOCUMENTS

| CN | 101938712 A | 1/2011 |
| WO | WO 2010/039833 A2 | 4/2010 |
| WO | WO 2011/011975 A1 | 2/2011 |

(Continued)

OTHER PUBLICATIONS

International Search Report issued Apr. 24, 2012 in Application No. PCT/GB2012/050367.

(Continued)

*Primary Examiner* — Afshawn Towfighi
(74) *Attorney, Agent, or Firm* — Oblon, McClelland, Maier & Neustadt, L.L.P.

(57) ABSTRACT

A method for supporting cross carrier indication of a control channel change notification for at least one wireless communication unit that is operating on a first serving communication cell and has been configured with access to at least one second serving communication cell in a wireless broadcast communication system. The method includes, at the base station: generating a message including a broadcast service identifier, wherein the broadcast service identifier identifies a control channel change of the at least one second serving cell accessible by the at least one wireless communication unit; and transmitting the message to the at least one wireless communication unit.

24 Claims, 6 Drawing Sheets

(56) References Cited

U.S. PATENT DOCUMENTS

2011/0038296 A1 2/2011 Yi et al.
2011/0077006 A1* 3/2011 Hsu .............................. 455/436

FOREIGN PATENT DOCUMENTS

| WO | WO 2011/020027 A1 | 2/2011 |
| WO | WO 2011/097930 A1 | 8/2011 |
| WO | WO 2012/097689 A1 | 7/2012 |

OTHER PUBLICATIONS

Search Report issued Jun. 16, 2011 in United Kingdom Application No. GB1102891.7.
Office Action issued Jan. 22, 2013 in United Kingdom Application No. GB1102891.7.
IPWireless Inc., "On the support for eMBMS in Carrier Aggregation", 3GPP Draft; R1-105687, 3GPP TSG RAN WG1 Meeting #62 bis, Oct. 11-15, 2010, 3 pages.
Rapporteur (Samsung), "Introduction of Carrier Aggregation", 3GPP Draft; R2-104516, 3GPP TSG-RAN WG2 Meeting #71, Aug. 23-27, 2010, 73 pages.
ZTE, "Remaining issues on carrier indicator field", 3GPP Draft; R1-102891, 3GPP TSG-RAN WG1 #61, May 10-14, 2010, 3 pages.
Samsung, "Clarifications regarding MBMS REL-10 CR to 36.331", 3GPP Draft; R2-110313, 3GPP TSG-RAN2#72 bis Meeting, Jan. 17-21, 2011, 10 pages.
Huawei (Rapporteur), "Stage-3 CR for MBMS enhancement", 3GPP Draft; R2-110800, 3GPP TSG-RAN WG2 Meeting #73, Feb. 21-25, 2011, 14 pages.
ETSI MCC, "Report of 3GPP TSG RAN WG2 meeting #71bis", 3GPP Draft; R2-106929, 3GPP TSG-RAN Working Group 2 meeting #72, Nov. 15-19, 2010, 144 pages.
Office Action issued on Dec. 8, 2015 in the corresponding Japanese Patent Application No. 2013-554014.
Combined Chinese Office Action and Search Report issued Dec. 30, 2015 in Patent Application No. 201280009343.3 (with English translation of categories of cited documents).

* cited by examiner

COMMUNICATION UNITS AND METHODS FOR CONTROL CHANGE NOTIFICATION IN BROADCAST COMMUNICATION

CROSS-REFERENCE TO RELATED APPLICATIONS

The present application claims priority to British Patent Application 1102891.7 filed in the U.K. on Feb. 18, 2011, the entire contents of which are incorporated herein by reference.

FIELD OF THE INVENTION

The field of the invention relates to communication units and methods for control change notification in broadcast communication. In particular, but not exclusively, the field of the invention relates to cross-carrier control channel change notification in a Long Term Evolution (LTE) $3^{rd}$ Generation Partnership Project (3GPP™) cellular communication system.

BACKGROUND OF THE INVENTION

Currently, 3rd generation cellular communication systems are being installed to further enhance the communication services provided to mobile phone users. The most widely adopted 3rd generation communication systems are based on Code Division Multiple Access (CDMA) and Frequency Division Duplex (FDD) or Time Division Duplex (TOO) technology. In CDMA systems, user separation is obtained by allocating different spreading and/or scrambling codes to different users on the same carrier frequency and in the same time intervals. This is in contrast to time division multiple access (TDMA) systems, where user separation is achieved by assigning different time slots to different users. An example of communication systems using these principles is the Universal Mobile Telecommunication System (UMTS™).

In order to provide enhanced communication services, the LTE version of 3rd generation cellular communication systems are designed to support a variety of different and enhanced services. One such enhanced service is multimedia services. The demand for multimedia services that can be received via mobile phones and other handheld devices is set to grow rapidly over the next few years. Multimedia services, due to the nature of the data content that is to be communicated, require a high bandwidth. The typical and most cost-effective approach in the provision of multimedia services is to 'broadcast' the multimedia signals, as opposed to sending the multimedia signals in an unicast (i.e. point-to-point) manner. Typically, tens of channels carrying say, news, movies, sports, etc., may be broadcast simultaneously over a communication network. Further description of LTE, can be found in Sesia, Toufik, Baker: 'LTE—The UMTS™ Long Term Evolution; From Theory to Practice', page 11. Wiley, 2009.

As radio spectrum is at a premium, spectrally efficient transmission techniques are required in order to provide users with as many broadcast services as possible, thereby providing mobile phone users (subscribers) with the widest choice of services. It is known that broadcast services may be carried over cellular networks, in a similar manner to conventional terrestrial Television/Radio transmissions. Thus, technologies for delivering multimedia broadcast services over cellular systems, such as the evolved Mobile Broadcast and Multicast Service (eMBMS) for the LTE aspect of E-UTRA, have been specified over the past few years. In these broadcast cellular systems, the same broadcast signal is transmitted over non-overlapping physical resources on adjacent cells within a conventional cellular system. Consequently, at the wireless subscriber unit, the receiver must be able to detect the broadcast signal from the cell it is connected to. Notably, this detection needs to be made in a presence of additional, potentially interfering broadcast signals, transmitted on the non-overlapping physical resources of adjacent cells.

To improve spectral efficiency, broadcast solutions have also been developed for cellular systems in which the same broadcast signal is transmitted by multiple cells but using the same (i.e. overlapping) physical resources. In these systems, cells do not cause interference to each other as the transmissions are arranged to be substantially time-coincident, and, hence, capacity is improved for broadcast services. Such systems are sometimes referred to as 'Single Frequency Networks', or 'SFNs'. In SFN systems, a common cell identifier (ID) is used to indicate those (common) cells that are to broadcast the same content at the same time. In the context of the present description, the term 'common cell identifier' encompasses any mechanism for specifying SFN operation, which may in some examples encompass a use of, say, a single scrambling code.

The LTE eMBMS feature was introduced to the 3GPP™ standard specifications in Release 9. When enabled, a wireless subscriber unit (referred to as user equipment (UE) in 3GPP™ parlance) is informed as to those subframes that have been allocated to eMBMS transmissions. The MBMS control channel (MCCH) and the MBMS traffic channel (MTCH) are multiplexed together in these subframes. The MCCH can change on a periodic basis, known as the MCCH modification period. In order to provide an efficient mechanism to notify UEs of upcoming changes to the MCCH, an MCCH change notification is transmitted in the modification period prior to the MCCH change. Thus, UEs are able to determine in advance that the MCCH information will have changed from the MCCH modification period boundary.

A MCCH change notification is contained in a physical downlink control channel (PDCCH) transmission located in an MBMS subframe. The PDCCH is located in the common search space of the PDCCH transmission space. A downlink control information (DCI) Format 1C of 8 bits is firstly padded, then a cyclic redundancy check (CRC) is added, before it is convolutionally encoded and mapped to the PDCCH. In order to distinguish this DCI from other DCI mapped to the PDCCH common search space, the CRC is scrambled by the unique MBMS radio network temporary identifier (M-RNTI).

Carrier Aggregation (CA) was introduced in Rel.10 of the 3GPP™ standards. CA supports the aggregation of two or more component carriers (CC), up to a total of five CCs, which advantageously provide wider transmission bandwidths of, say, up to 100 MHz, for some UEs to utilise. CA allows a UE to simultaneously receive one or multiple component carriers, depending on the UE's capabilities. A UE that is capable of the aggregation of multiple component carriers can be configured to be cross-carrier scheduled, e.g. the allocation information for resources on one component carrier is transported on a different component carrier. It is also possible to aggregate a different number of component carriers of possibly different bandwidths in the uplink (UL) and the downlink (DL) channels. In typical TDD deployments, the number of component carriers and the bandwidth of each component carrier in UL and DL will be the same.

However, when a UE is not cross-carrier scheduled, then the UE is configured to read the component carrier (CC) physical downlink control channel (PDCCH) on each serving-cell in order to determine whether or not a resource allocation is present on that component carrier. If a UE is cross-carrier scheduled, a carrier indicator field (CIF) can be semi-statically configured to enable cross-carrier UL and DL assignment of frequencies for use, for example using the PDCCH in a first component carrier (CC1) to allocate a physical downlink shared channel (PDSCH) resource in a second component carrier (CC2).

When operating in an aggregated carrier mode, each UE is configured with one or more serving cells. Among these serving cells, one is designated the primary cell (Pcell) and any others are designated as secondary cells (Scells). The Pcell designation is UE-specific and certain attributes are associated with the Pcell. Each serving-cell is designed to be Release 8/9 backwards compatible.

However, the Release 10 of the 3GPP™ standard specification does not support CIF in the DCI Format 1C, as used in Release 9 eMBMS. Furthermore, eMBMS has not been discussed as part of Release 10 of the 3GPP™ standard. Therefore, no solution to supporting cross-carrier scheduling of eMBMS signalling exists, particularly in a case where a UE desiring eMBMS content is capable of carrier aggregation. In addition, within Release 10 of the 3GPP™ standard, a UE is not expected to decode the common search space on a secondary cell (Scell). Hence, amongst other factors, the LTE specification is silent on providing for MBMS control channel change notification on any carrier other than the primary carrier/cell (Pcell) (as defined for Release 9).

Consequently, current techniques are suboptimal. In particular, there is no current technique to provide cross carrier indication of an MCCH change notification for LTE CA, for a situation where a UE is operating on a primary cell (Pcell) and is configured with at least one secondary cell (Scell). Hence, a provision of such a solution would be advantageous.

SUMMARY OF THE INVENTION

Various aspects and features of the present invention are set out in the claims.

Embodiments of the invention seek to mitigate, alleviate or eliminate one or more of the abovementioned disadvantages singly or in any combination.

According to a first aspect of the invention, there is provided a method for supporting cross carrier indication of a control channel change notification for at least one wireless communication unit that is operating on a first serving communication cell and has been configured with access to at least one second cell in a wireless broadcast communication system. The method comprises, at the base station: generating a message comprising a broadcast service identifier, for example an MBMS radio network temporary identifier (M-RNTI), wherein the broadcast service identifier (e.g. M-RNTI) identifies a control channel change of at least one second serving communication cell accessible by the at least one wireless communication unit; and transmitting the message to the at least one wireless communication unit.

In one optional example embodiment, generating the message comprising the broadcast service identifier identifying the control channel change of the at least one second serving communication cell may comprise selecting the broadcast service identifier from a plurality of broadcast service identifiers that each identify a respective second serving communication cell. In this manner, the at least one wireless communication unit may be able to determine to which of the at least one second serving communication cells the change of control channel information applies.

In one optional example embodiment, generating the message comprising the broadcast service identifier identifying the control channel change of the at least one second serving communication cell may comprise determining the at least one second serving communication cell to identify using the broadcast service identifier; and scrambling a first broadcast service identifier (e.g. first M-RNTI) based on the determined at least one second serving communication cell and thereby producing a second broadcast service identifier (e.g. second M-RNTI) that identifies a resource change of at least one second serving communication cell accessible by the at least one wireless communication unit, which may comprise scrambling the first broadcast service identifier with a set of pre-defined scrambling sequences. Furthermore, in one optional example embodiment, producing a second broadcast service identifier may comprise validating that the second broadcast service identifier does not coincide with an existing identifier. In this manner, a set of broadcast service identifiers is defined that do not intersect with the set of already defined identifiers.

In one optional example embodiment, generating the message comprising the broadcast service identifier may comprise using the broadcast service identifier to generate a DCI format 1C message that identifies a control channel change of at least one second serving communication cell accessible by the at least one wireless communication unit. Furthermore, in one optional example embodiment, generating the DCI format 1C message using the broadcast service identifier may comprise altering a state of padding bits, such that the padding bits identify a control channel change of at least one second serving communication cell accessible by the at least one wireless communication unit In one optional example embodiment, the control channel change notification is an MBMS control channel (MCCH) change notification. In one optional example embodiment, the wireless broadcast communication system supports a LTE multicast broadcast multimedia service.

According to a second aspect of the invention, there is provided a non-transitory computer program product comprising executable program code for supporting cross carrier indication of a control channel change notification for at least one wireless communication unit that is operating on a first communication cell and has access to at least one second cell in a wireless broadcast communication system, substantially in accordance with the first aspect.

According to a third aspect of the invention, there is provided a base station for supporting cross carrier indication of a control channel change notification for at least one wireless communication unit that is operating on a first serving communication cell and has been configured with access to at least one second serving communication cell in a wireless broadcast communication system. The base station comprises: signal processing logic arranged to generate a message comprising a broadcast service identifier (e.g. M-RNTI), wherein the broadcast service identifier identifies a control channel change of at least one second serving communication cell accessible by the at least one wireless communication unit; and a transmitter for transmitting the message to the at least one wireless communication unit.

According to a fourth aspect of the invention, there is provided an integrated circuit for a base station comprising signal processing logic substantially in accordance with the third aspect.

According to a fifth aspect of the invention, there is provided a method for supporting cross carrier indication of a control channel change notification for a wireless communication unit that is operating on a first serving communication cell and has access to at least one second serving communication cell in a wireless broadcast communication system.

The method comprises, at the wireless communication unit: receiving a message on the first serving communication cell; decoding the message to determine a broadcast service identifier (e.g. M-RNTI), wherein the broadcast service identifier identifies a control channel change of at least one second serving communication cell accessible by the at least one wireless communication unit; and transferring to the at least one second serving communication cell in response to the decoded message.

In one optional example embodiment, the decoding the message comprising the broadcast service identifier identifying the control channel change of the at least one second serving communication cell may comprise de-scrambling a first broadcast service identifier based on the to be determined at least one second serving communication cell and thereby producing a second broadcast service identifier that identifies the control channel change of the at least one second serving communication cell.

In one optional example embodiment, de-scrambling the first broadcast service identifier (e.g. first M-RNTI) based on the determined at least one second serving communication cell may comprise de-scrambling the first broadcast service identifier (e.g. first M-RNTI) with a set of pre-defined scrambling sequences to distinguish between identification of multiple second serving communication cells.

According to a sixth aspect of the invention, there is provided a non-transitory computer program product comprising executable program code for supporting cross carrier indication of a control channel change notification for a wireless communication unit that is operating on a first serving communication cell and has access to at least one second serving communication cell in a wireless broadcast communication system, substantially in accordance with the fifth aspect.

According to a seventh aspect of the invention, there is provided a wireless communication unit for supporting cross carrier indication of a control channel change notification for a wireless communication unit that is operating on a first serving communication cell and has been configured with access to at least one second serving communication cell in a wireless broadcast communication system. The wireless communication unit comprises signal processing logic arranged to: receive a message on the first serving communication cell; decode the message to determine a broadcast service identifier (e.g. M-RNTI), wherein the broadcast service identifier (e.g. M-RNTI) identifies a control channel change of at least one second serving communication cell accessible by the at least one wireless communication unit; and transfer to the at least one second serving communication cell in response to the decoded message.

According to an eighth aspect of the invention, there is provided an integrated circuit for a wireless communication unit comprising signal processing logic substantially in accordance with the seventh aspect.

According to a ninth aspect of the invention, there is provided a broadcast wireless communication system comprising a base station in accordance with the third aspect and a wireless communication unit in accordance with the seventh aspect.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

The following description focuses on embodiments of the invention applicable to a Long Term Evolution (LTE) cellular communication system and, in particular, to an LTE Radio Access Network (RAN) operating in any paired or unpaired spectrum within a $3^{rd}$ generation partnership project (3GPP™) system. However, it will be appreciated that the invention is not limited to this particular cellular communication system, but may be applied to any cellular communication system supporting broadcast communication. The following description also focuses on embodiments of the invention applicable to providing broadcast (e.g. uni-directional) services on an LTE cellular communication system, for example one supporting an evolved Mobile Broadcast and Multicast Service (eMBMS). eMBMS is a broadcasting and multicasting service offered over mobile telecommunications networks, such as the Evolved Packet System (EPS), and the like. The technical specifications for eMBMS include 3GPP™ TS 36.300.

Example embodiments described herein may be applied, for example, to provide full flexibility in cross carrier indication of MCCH change notification, for example in a scenario whereby eMBMS data is transported over an LTE communication system. In the examples, a skilled artisan will appreciate that the term component carrier (CC), in a context of a communication channel, may be considered in some instances as synonymous with the term serving-cell, in supporting communications to UEs residing in a geographical area, and the terms may be used interchangeably, hereinafter.

Figure 1:
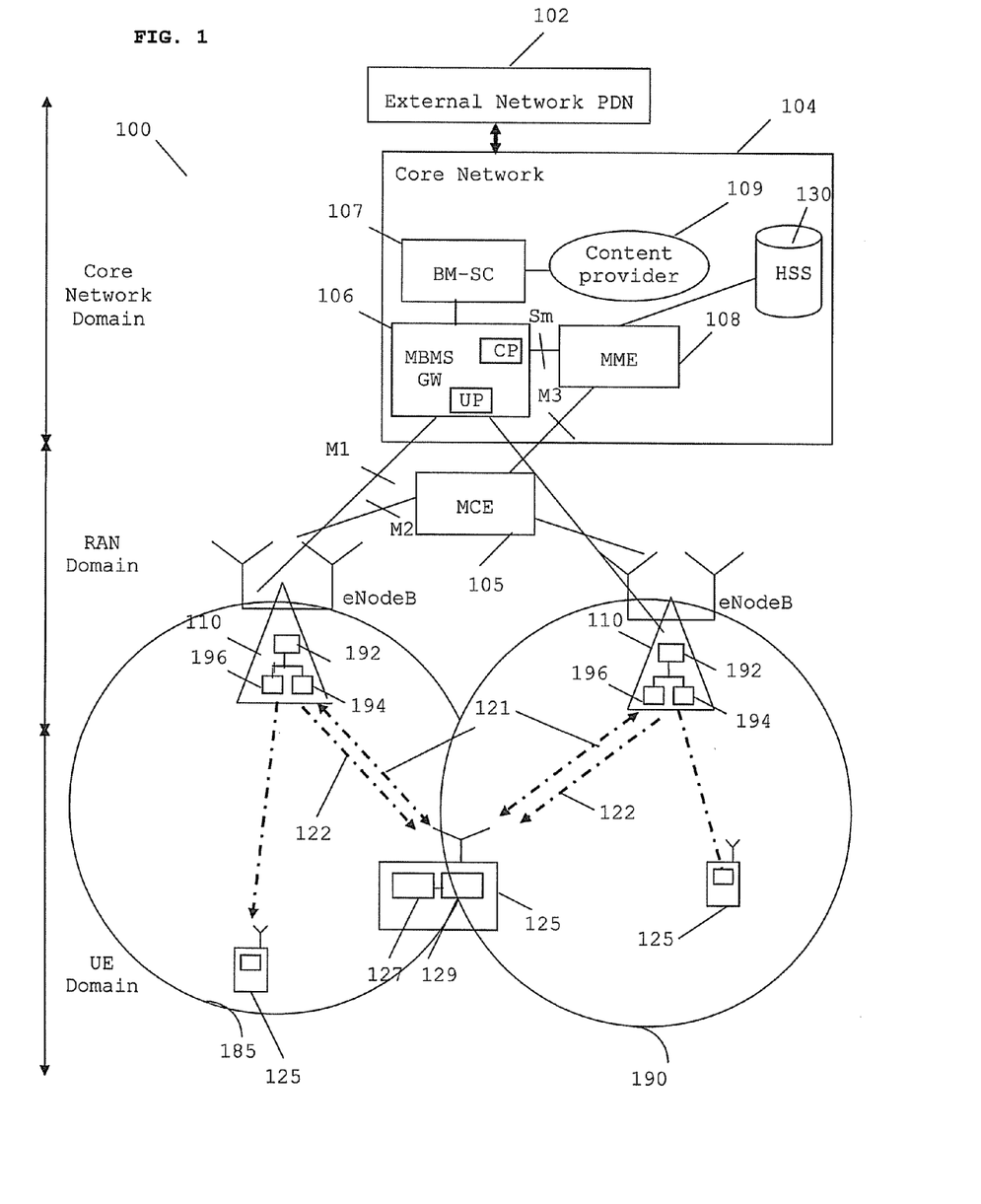
FIG. 1 illustrates a 3GPP™ LTE cellular communication system in accordance with some example embodiments of the present invention.

Referring now to FIG. 1, a wireless communication system 100 is shown in outline, in accordance with one example embodiment of the invention. In this example embodiment, the wireless communication system 100 is compliant with, and contains network elements capable of operating over, a universal mobile telecommunication system (UMTS™) air-interface. In particular, the embodiment relates to a system's architecture for an Evolved-UMTS Terrestrial Radio Access Network (E-UTRAN) wireless communication system, which is currently under discussion in the third Generation Partnership Project (3GPP™) specification for long term evolution (LTE), based around OFDMA (Orthogonal Frequency Division Multiple Access) in the downlink (DL) and SCFDMA (Single Carrier Frequency Division Multiple Access) in the uplink (UL), as described in the 3GPP™ TS 36.xxx series of specifications. Within LTE, both time division duplex (TDD) and frequency division duplex (FDD) modes are defined. In particular, the example embodiment of the LTE system may be adapted to support broadcast E-UTRAN communication in one or more communication cells.

The wireless communication system 100 architecture consists of radio access network (RAN) and core network (CN) elements, with the core network 104 being coupled to external networks 102 (named Packet Data Networks (PDNs)), such as the Internet or a corporate network. The CN 104 comprises a broadcast media service centre (BM-SC) 107 that, in one example, is coupled to, in order to receive broadcast content, a content provider 109. The CN 104 also comprises, in this example, an evolved multicast broadcast multimedia server (MBMS) gateway (GW) 106 coupled to the BM-SC 107 and coupled to a mobility management entity (MME) 108 via an Sm interface. The MME 108 manages session control of MBMS bearers and is operably coupled to a home subscriber service (HSS) database 130 storing subscriber communication unit (UE) related information. The MBMS gateway 106 acts as a mobility anchor point and provides IP multicast distribution of the MBMS user plane data to the eNodeBs. The MBMS gateway 106 receives MBMS content via the Broadcast Multicast Service Centre (BM-SC) 107 from one or more content providers 109.

For control plane (CP) data, a MBMS co-ordination entity (MCE) 105 resides in the E-UTRAN between the MME 108 and the eNodeBs 110. The MCE 105 manages the layer-2 configurations and the use of the radio resources for broadcast transmission. Thus, the MCE 105 is a RAN domain element and can be either a separate entity (as shown) or located at the eNodeB 110. For user plane (UP) data, the BM-SC 107 is directly coupled to the eNodeBs 110 via an M1 interface.

As illustrated, the CN 104 is operably connected to two eNodeBs 110, with their respective coverage zones or cells 185, 190 and a plurality of UEs 125 receiving transmissions from the CN 104 via the eNodeBs 110. In accordance with example embodiments of the present invention, at least one eNodeB 110 and at least one UE 125 (amongst other elements) have been adapted to support the concepts hereinafter described.

The main component of the RAN is an eNodeB (an evolved NodeB) 110, which performs many standard base station functions and is connected to the CN 104 via M1 interface and to the UEs 125 via an Uu interface. A wireless communication system will typically have a large number of such infrastructure elements where, for clarity purposes, only a limited number are shown in FIG. 1. The eNodeBs 110 control and manage the radio resource related functions for a plurality of wireless subscriber communication units/terminals (or user equipment (UE) 125 in UMTS™ nomenclature).

As illustrated, each eNodeB 110 comprises one or more wireless transceiver unit(s) 194 that is/are operably coupled to a signal processor module 196 and memory 192 for storing, inter alia, information relating to broadcast service identifiers, such as, in this example. MBMS radio network temporary identifiers (M-RNTIs). Example embodiments of the invention utilize the one or more wireless transceiver unit(s) 194, the signal processor module 196 is arranged to generate a message comprising a broadcast service identifier (e.g. M-RNTI), to be used to identify a control channel change (such as a MCCH change) of at least one serving cell accessible by the at least one wireless communication unit, such as UE 125. The one or more wireless transceiver unit(s) 194 communicate with the UEs 125 via a unicast channel 121 or broadcast multimedia content on a broadcast channel 122.

Each of the UEs comprise a transceiver unit 127 operably coupled to signal processing logic 129 (with one UE illustrated in such detail for clarity purposes only and to illustrate this UE as being able to receive both broadcast content on the broadcast channel 122 as well as hold unicast communications on the unicast channel 121 and communicate with the eNodeB 110 supporting communication in their respective location area. The system comprises many other UEs 125 and eNodeBs 110, which for clarity purposes are not shown.

Radio Network Temporary Identifier(s) (RNTIs) are used, in one instance, by eNB Physical Layer (PHY) for scrambling the cyclic redundancy check (CRC) bits in each of the downlink control information (DCI) code words to be transmitted on the physical downlink control channel (PDCCH). This scrambling process in PHY happens before modulation. An RNTI is also known for MBMS systems, referred to as M-RNTI. If the PDCCH is destined for a specific UE, a UE-specific RNTI is used for the scrambling operation and the DCI is located in the UE-specific search space. If the PDCCH is destined for multiple UEs, a common RNTI is used for the scrambling operation and the DCI is located in the common search space. An M-RNTI is an example of one such common RNTI that can be used for MBMS control channel (MCCH) change notification. At the UE, the DCI formats are de-scrambled with various RNTI to ascertain the nature of the DCI contents. For instance, if a DCI Format 1C is decoded, and after de-scrambling the CRC with the M-RNTI, the all zeros sequence is obtained, and, thus, the DCI Format 1C is assumed to contain an MCCH change notification.

In a first illustrated example embodiment, several additional broadcast service identifiers (e.g. M-RNTIs) are used, one for each secondary cell supported by a respective eNodeB 110, as illustrated in table 1 below.

TABLE 1

Example mapping of M-RNTI to Scell.

| M-RNTI | Scell |
|---|---|
| $M\text{-}RNTI_1$ | 1 |
| $M\text{-}RNTI_2$ | 2 |
| $M\text{-}RNTI_3$ | 3 |
| $M\text{-}RNTI_4$ | 4 |

For example, in this first illustrated example embodiment, each respective eNodeB implicitly signals to each UE the Scell the MCCH change indication applies to through selection of the corresponding M-RNTI. In one example, the mapping between respective M-RNTIs and associated Scells (and their supporting eNodeBs) may be configured by higher layers in the LTE protocol stack.

In this manner, a 'physically' different mechanism is used to distinguish between multiple Scells. Advantageously, by introducing several new M-RNTIs, as illustrated in the example table in Table 1, the M-RNTI used for the primary cell (Pcell), in order to support Release 8/9 of 3GPP™ standards, may be extended to support the example embodiments herein described when an Scell is available and used, thereby advantageously facilitating backwards compatibility.

In order to facilitate such a mapping between M-RNTIs and serving cells, as described in some examples, the serving cells may be similarly ordered for each of the connected UEs. This does not preclude each UE having a distinct Pcell, or a different number of serving cells, as illustrated in the example table in Table 2. Table 2 shows five example UEs ('A' through 'E'), with each UE having a different Pcell. When a serving cell is added, higher layer signalling is used and this also assigns a cell index reference for use in subsequent signalling. In the context of some examples, this higher layer signalling may be modified to ensure that the additional serving cells were similarly ordered.

TABLE 2

Example mapping of physical cells to serving cells.

| | $UE_A$ | $UE_B$ | $UE_C$ | $UE_D$ | $UE_E$ |
|---|---|---|---|---|---|
| $Cell_1$ | Pcell | $Scell_1$ | $Scell_1$ | $Scell_1$ | $Scell_1$ |
| $Cell_2$ | $Scell_1$ | Pcell | $Scell_2$ | $Scell_2$ | $Scell_2$ |
| $Cell_3$ | $Scell_2$ | $Scell_2$ | Pcell | $Scell_3$ | $Scell_3$ |
| $Cell_4$ | $Scell_3$ | $Scell_3$ | $Scell_3$ | Pcell | $Scell_4$ |
| $Cell_5$ | $Scell_4$ | $Scell_4$ | $Scell_4$ | $Scell_4$ | Pcell |

In a second example embodiment, in addition or as an alternative to the first example embodiment, a single (Pcell) broadcast service identifier (e.g. M-RNTI) is used to scramble the cyclic redundancy check (CRC) of the PDCCH. In one example, scrambling the CRC of the PDCCH may be performed using an 'exclusive or' (XOR) operation of the respective binary elements of the CRC and the M-RNTI. In one optional example of the second example embodiment, four scrambling codes are added in order to scramble a single Pcell M-RNTI based on the desired Scell indication. In other applications, other numbers of scrambling codes may be employed. In this manner, at least from a physical perspective, the scrambling of the M-RNTI in the second example embodiment and the use of different M-RNTIs in the first example embodiment may be regarded as producing similar results.

In various examples, a checking mechanism may be performed in either the CN 104 or the eNodeB 110, the MCE 105 or a separate operations and management entity to ensure that by scrambling the M-RNTI, another valid RNTI was not created, e.g. that the scrambled M-RNTI did not intersect with the set of existing RNTI. For example, in one example, the eNodeB 110 may be aware of the scrambling codes employed for the second example embodiment and is thus able to choose not to assign the scrambled M-RNTIs for any other use within the cell. In such an implementation, the eNodeB 110 effectively reserves RNTI space where the scrambled M-RNTI would appear and constructs a new M-RNTI by scrambling an existing M-RNTI with a set of pre-defined scrambling sequences. Advantageously, the second example embodiment also provides backwards compatibility to support Release 8 and/or Release 9 UEs.

The aforementioned first and second example embodiments enable signalling of independent MCCH change notifications on up to five CCs; thus providing full flexibility for UE operation. In other applications, other numbers of CCs may be supported.

In a third example embodiment, a modification to the current DCI Format 1C may be used to provide information for MCCH change notifications. DCI Format 1C is contained within the common search space. As currently specified DCI Format 1C can only be read by a UE on an Scell if the UE is not configured for cross-carrier scheduling. For the case of a UE configured for cross-carrier scheduling there is no requirement for the UE to decode the common search space on an Scell.

The current DCI Format 1C uses '8' bits for operation as defined in [TS 36.212]. The remaining information bits are padded until the size is equal to that of Format 1C used for very compact scheduling of one PDSCH codeword. Table 2 provides DCI Format 1C lengths for different channel bandwidths.

TABLE 3

DCI Format 1C size (excluding CRC)
size for different channel bandwidths.

| Channel bandwidth (MHz) | Number of Resource Blocks ($N_{RB}$) | Format 1C size (bits) (excluding 16 CRC bits) | Number of padding bits |
|---|---|---|---|
| 1.4 | 6 | 8 | 0 |
| 3 | 15 | 10 | 2 |
| 5 | 25 | 12 | 4 |
| 10 | 50 | 13 | 5 |
| 15 | 75 | 14 | 6 |
| 20 | 100 | 15 | 7 |

In the third example embodiment, for the case of channel bandwidths of 3 MHz and above, padding bits are inserted immediately following the 8-bit MCCH change notification, as illustrated in Table 3. In particular, these padding bits can be used to indicate to which serving cell the MCCH change notification applies. Three bits are required to indicate up to five component carriers (CCs). As with carrier indication then higher layer signalling can provide a mapping from bits to CC. Although 1.4 and 3 MHz do not have enough padding bits to signal all five CCs, such a limitation is likely to be minimal in practice as it is unlikely that either of these carriers would be configured for cross carrier scheduling due to their already limited control channel resource. Therefore the 8-bit MCCH change notification is used in combination with the CC indication on the padding bits in order to indicate to the UE which CC the MCCH change notification applies. This third example embodiment is described in greater detail with respect to FIG. 6.

In a fourth example embodiment, a new additional broadcast service identifier (e.g. $M-RNTI_x$), is used for DCI Format 1C to provide information for MCCH change notifications when the 8-bit MCCH change notification is relevant to a Scell, and thus supports Release 8/9 backwards compatibility. Such an introduction of a new $M-RNTI_x$ is in addition to the existing M-RNTI that is used for DCI Format 1C when the 8 bit MCCH change indication is relevant to the Pcell. Therefore, if the new additional $M-RNTI_x$ is used only 2 padding bits (per the third example embodiment) are used to indicate to which Scell (e.g. as configured by higher layers) the MCCH change notification is relevant. In other applications, other numbers of padding bits may be employed.

Alternatively, or additionally, in a fifth example embodiment, a new DCI format may be introduced to provide information for MCCH change notifications on secondary carriers in order to support eMBMS functionality. In this example, a UE may be configured to attempt to decode the new DCI format that indicates an MCCH change notification on a secondary carrier. Such a new DCI format may be contained in the common search space and provide an indication to the serving cell that the MCCH change notification is applied in accordance with previous examples. The new DCI format may optionally have its CRC scrambled with the existing unique broadcast service identifier (e.g. M-RNTI), or employ a new additional broadcast service identifier (e.g. M-RNTI) in accordance with other examples.

Figure 2:
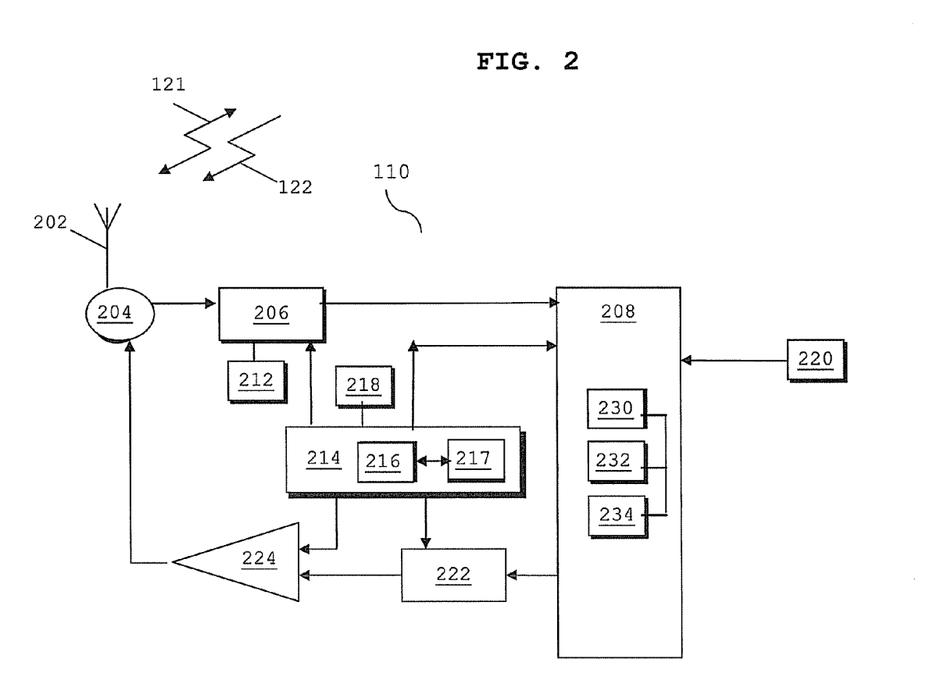
FIG. 2 illustrates an example of a wireless communication unit, such as an eNodeB adapted in accordance with some example embodiments of the present invention.

Referring now to FIG. 2, a block diagram of a wireless communication unit, adapted in accordance with some example embodiments of the invention, is shown. In practice, purely for the purposes of explaining embodiments of the invention, the wireless communication unit is described in terms of an eNodeB 110. The wireless communication unit 110 contains an antenna, an antenna array 202, or a plurality of antennae, coupled to antenna switch 204 that provides isolation between receive and transmit chains within the wireless communication unit 110. One or more receiver chains, as known in the art, include receiver front-end circuitry 206 (effectively providing reception, filtering and intermediate or base-band frequency conversion). The receiver front-end circuitry 206 is coupled to a signal processing module 208 (generally realised by a digital signal processor (DSP)). The one or more receiver chain(s) is/are operably configured to receive unicast communication from one or more UEs. A skilled artisan will appreciate that the level of integration of using receiver circuits or components may be, in some instances, implementation-dependent.

The receiver chain includes received signal quality indicator logic or circuitry 212, which in turn is coupled to a controller 214 that maintains overall control of the wireless communication unit 110. The controller 214 maintains overall operational control of the wireless communication unit 110. The controller 214 is also coupled to the receiver front-end circuitry 206 and the signal processing module 208. In some examples, the controller 214 is also coupled to a buffer module 217 and a memory device 216 that selectively stores operating regimes, such as decoding/encoding functions, synchronisation patterns, code sequences, and the like. A timer 218 is operably coupled to the controller 214 to control the timing of operations (transmission or reception of time-dependent signals) within the wireless communication unit 110.

As regards the transmit chain, this essentially includes an eMBMS input module 220, coupled in series through transmitter/modulation circuitry 222 and a power amplifier 224 to the antenna, antenna array 202, or plurality of antennae. The transmitter/modulation circuitry 222 and the power amplifier 224 are operationally responsive to the controller 214 and operably configured to broadcast a received eMBMS data packet stream to a plurality of UEs within coverage range of the wireless communication unit 110.

The signal processor module 208 in the transmit chain may be implemented as distinct from the signal processor in the receive chain. Alternatively, a single processor may be used to implement a processing of both transmit and receive signals, as shown in FIG. 2. Clearly, the various components within the wireless communication unit 110 can be realized in discrete or integrated component form, with an ultimate structure therefore being an application-specific or design selection.

In the first example, the signal processor module 208 of the wireless communication unit (eNodeB) 110 is informed that a MBMS control channel (MCCH) change notification is required. For example, the signal processor module 208 of the wireless communication unit (eNodeB) 110 is informed as to which serving cell the change notification applies, and can then select the corresponding broadcast service identifier (e.g. M-RNTI) (from several broadcast service identifiers (e.g. several M-RNTIs)) as being associated with a particular serving cell that the MCCH change indication applies to.

Additionally or alternatively, in the second example, the signal processor module 208 of the wireless communication unit (eNodeB) 110 is informed which serving cell the change notification applies to and scrambles a cyclic redundancy check (CRC) of a PDCCH change notification message with an appropriate broadcast service identifier (e.g. M-RNTI).

Additionally or alternatively, in the third example, the signal processor module 208 of the wireless communication unit (eNodeB) 110 may be informed which serving cell the change notification applies to and sets an appropriate bit pattern for the padding bits, for example as illustrated in Table 3, as being associated with a particular serving cell that the MCCH change indication applies to, for example according to higher layer signalling.

Additionally or alternatively, in the fourth example, the signal processor module 208 of the wireless communication unit (eNodeB) 110 may be informed which serving cell the change notification applies to and, if it applies to a secondary cell (Scell), a new additional broadcast service identifier (e.g. $M\text{-}RNTI_x$), may be used to scramble the CRC. The bit pattern for the padding bits may be set as being associated with a particular serving cell that the MCCH change indication applies to, for example according to higher layer signaling.

Additionally or alternatively, in the fifth example, the signal processor module 208 of the wireless communication unit (eNodeB) 110 may be informed which serving cell the change notification applies to and, if it applies to a secondary cell (Scell), a new DCI format may be used to indicate the MCCH change notification and the particular Scell that it applies to.

Advantageously, the described examples provide backwards compatibility to earlier 3GPP™ releases.

Figure 3:
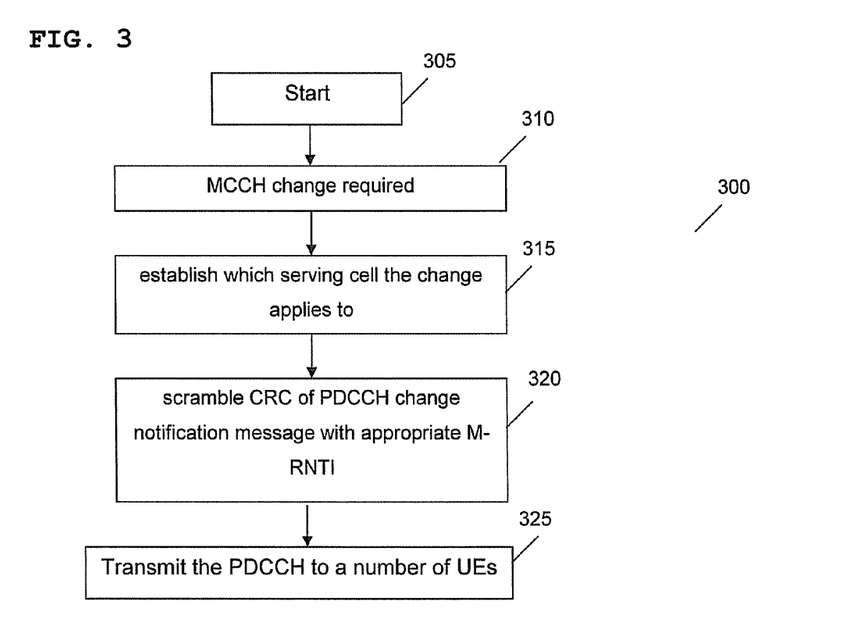
FIG. 3 illustrates an example of a flowchart employed at an eNodeB to support cross carrier scheduling for broadcast communications in accordance with some example embodiments of the invention.

Referring now to FIG. 3, an example of a flowchart 300 is illustrated to support an eNodeB operation in accordance with the first and second example embodiments. The eNodeB operations start at 305 and move on to 310, where the eNodeB is informed that a MBMS control channel (MCCH) change is required. The eNodeB then establishes which serving cell the change notification applies to, as shown in 315. Additionally or alternatively, in accordance with the first example, the eNodeB may then scramble the cyclic redundancy check (CRC) of the PDCCH change notification message with an appropriate broadcast service identifier (e.g. M-RNTI), as shown in 320. The PDCCH is then transmitted from the eNodeB to a plurality of UEs, as shown in 325

Figure 4:
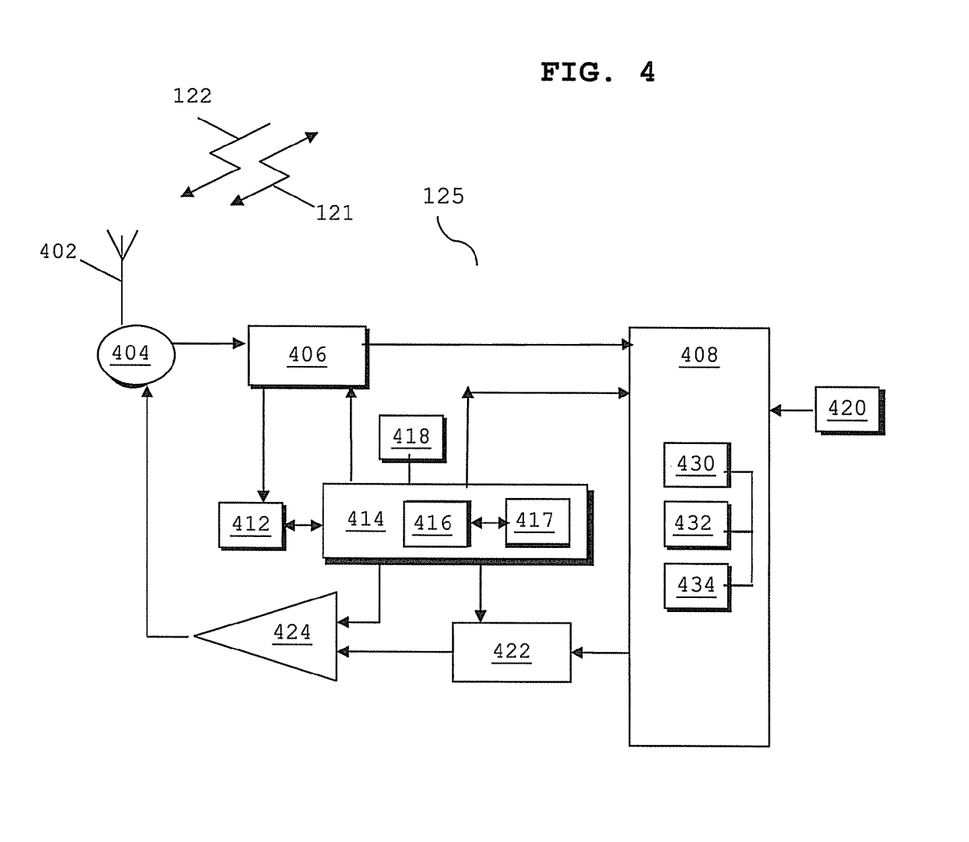
FIG. 4 illustrates an example of a wireless communication unit, such as an user equipment adapted in accordance with some example embodiments of the present invention.

Referring now to FIG. 4, a block diagram of a wireless communication unit, adapted in accordance with some example embodiments of the invention, is shown. In practice, purely for the purposes of explaining embodiments of the invention, the wireless communication unit is described in terms of a wireless subscriber communication unit such as a UE 125. The wireless communication unit 125 contains an antenna, an antenna array 402, or a plurality of antennae, coupled to antenna switch 404 that provides isolation between receive and transmit chains within the wireless communication unit 125. One or more receiver chains, as known in the art, include receiver front-end circuitry 406 (effectively providing reception, filtering and intermediate or base-band frequency conversion). The receiver front-end circuitry 406 is coupled to a signal processing module 408 (generally realised by a digital signal processor (DSP)). The one or more receiver chain(s) is/are operably configured to receive a broadcast data packet stream in one or more subframes over an eMBMS network. A skilled artisan will appreciate that the level of integration of using receiver circuits or components may be, in some instances, implementation-dependent.

The receiver chain includes received signal quality indicator logic or circuitry 412, which in turn is coupled to a controller 414 that maintains overall subscriber unit control. The controller 414 or signal processing module 408 may receive signal quality information, for example in a form of bit error rate (BER), frame error rate (FER) or block error rate (BLER) data, from recovered broadcast content information. The controller 414 maintains overall operational control of the wireless communication unit 125. The controller 414 is also coupled to the receiver front-end circuitry 406 and the signal processing module 408. In some examples, the controller 414 is also coupled to a buffer module 417 and a memory device 416 that selectively stores operating regimes, such as decoding/encoding functions, synchronisation patterns, code sequences, and the like. A timer 418 is operably coupled to the controller 414 to control the timing of operations (transmission or reception of time-dependent signals) within the wireless communication unit 125.

As regards the transmit chain, this essentially includes an eMBMS input module 420, coupled in series through transmitter/modulation circuitry 422 and a power amplifier 424 to the antenna, antenna array 402, or plurality of antennae. The transmitter/modulation circuitry 422 and the power amplifier 424 are operationally responsive to the controller 414 and operably configured to broadcast a received eMBMS data packet stream to a plurality of UEs within coverage range of the supporting eNodeB 110.

The signal processor module 408 in the transmit chain may be implemented as distinct from the signal processor in the receive chain. Alternatively, a single processor may be used to implement a processing of both transmit and receive signals, as shown in FIG. 4. Clearly, the various components within the wireless communication unit 424 can be realized in discrete or integrated component form, with an ultimate structure therefore being an application-specific or design selection.

In the first example, the signal processor module 408 of the wireless communication unit (UE) 125 determines that a MBMS control channel (MCCH) change has been implemented and establishes which serving cell the change notification applies to by interpreting a selection of the corresponding broadcast service identifier (e.g. M-RNTI) (from several broadcast service identifiers (e.g. M-RNTIs)) as being associated with a particular serving cell.

Additionally or alternatively, in the second example, the signal processor module 408 of the wireless communication unit (UE) 125 establishes which serving cell the change notification applies to by unscrambling a cyclic redundancy check (CRC) of a MCCH change notification message contained in a PDCCH with an appropriate broadcast service identifier (e.g. M-RNTI).

Additionally or alternatively, in the third example, the signal processor module 408 of the wireless communication unit (UE) 125 establishes the serving cell that the change notification applies to by interpreting the bit pattern of the padding bits of the DCI Format 1C with the CRC scrambled with the broadcast service identifier (e.g. M-RNTI).

Additionally or alternatively, in the fourth or fifth examples, the signal processor module 408 of the wireless communication unit (UE) 125 establishes which serving cell the change notification applies to by determining the new additional broadcast service identifier (e.g. M-RNTI$_x$) has been used or by determining the new DCI Format that indicates the MCCH change notification has been used.

Figure 5:
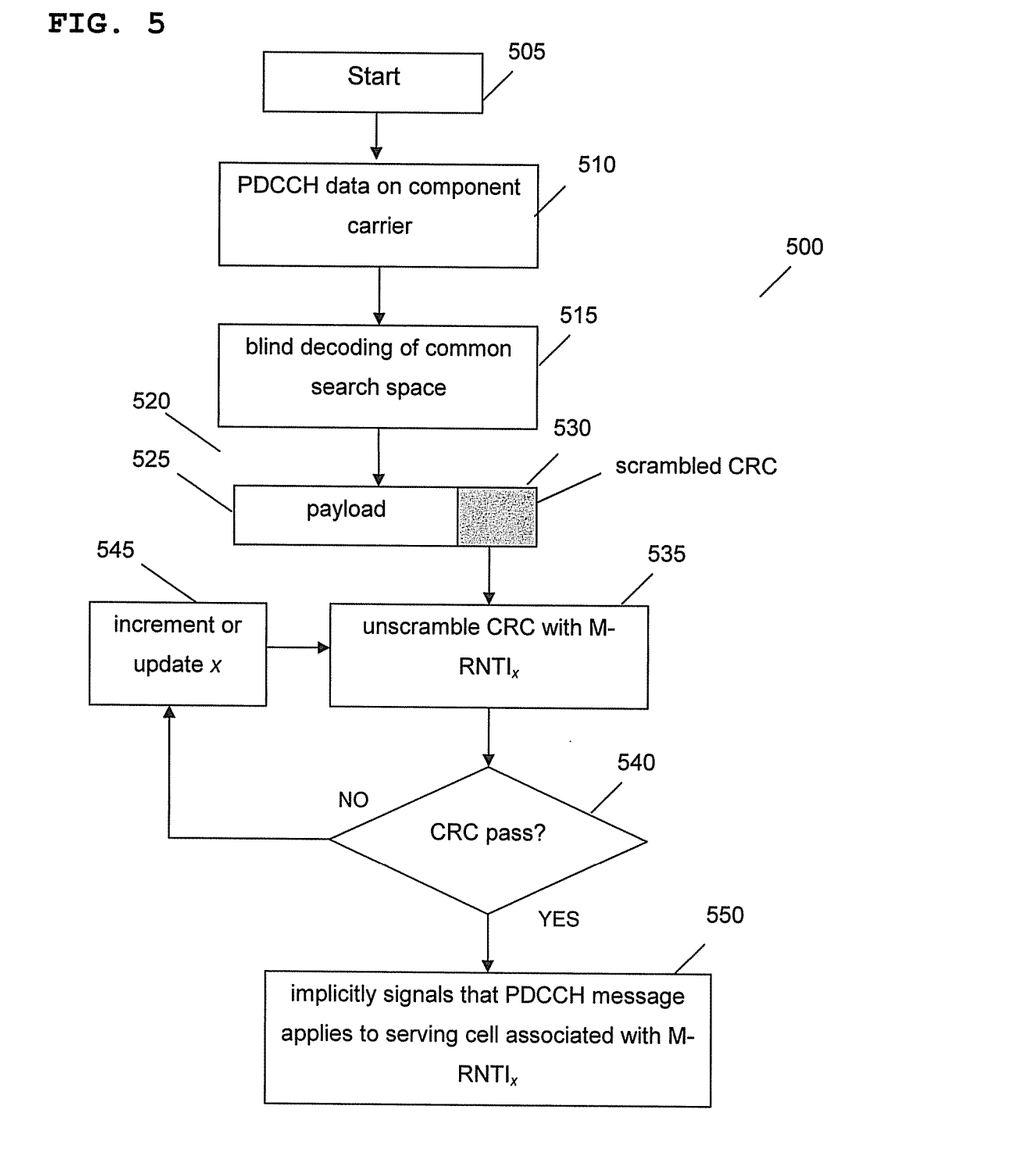
FIG. 5 illustrates an example of a flowchart employed at an user equipment to support cross carrier scheduling for broadcast communications in accordance with some example embodiments of the invention.

Referring now to FIG. 5, a first example of a flowchart 500 to support a UE operation in accordance with the first and second example embodiments is illustrated. The UE operation starts at step 505 and moves on to step 510 where the UE receives physical downlink control channel (PDCCH) data on a component carrier (CC). The UE than performs blind decoding of downlink control information in a common search space, as shown in step 515. The UE's blind decoding produces a received data packet(s) 520 comprising a data payload 525 and a CRC value 530 that can be unscrambled. The UE then unscrambles the cyclic redundancy check (CRC) of the PDCCH data with the broadcast service identifier (e.g. M-RNTI), as shown in step 535. The UE then determines, in accordance with the first example embodiment, whether (or not) the unscrambled CRC contains all zeros, as shown in step 540. If the UE determines that the CRC does not pass, in step 540, the broadcast service identifier (e.g. M-RNTI) value is either incremented or updated to another broadcast service identifier (e.g. M-RNTI), in step 545, and the process loops to step 535 using the new broadcast service identifier (e.g. M-RNTI). If the UE determines that the CRC does pass, in step 540, the UE is implicitly signalled that the PDCCH message applies to the serving cell associated with the M-RNTI, as shown in step 550.

Figure 6:
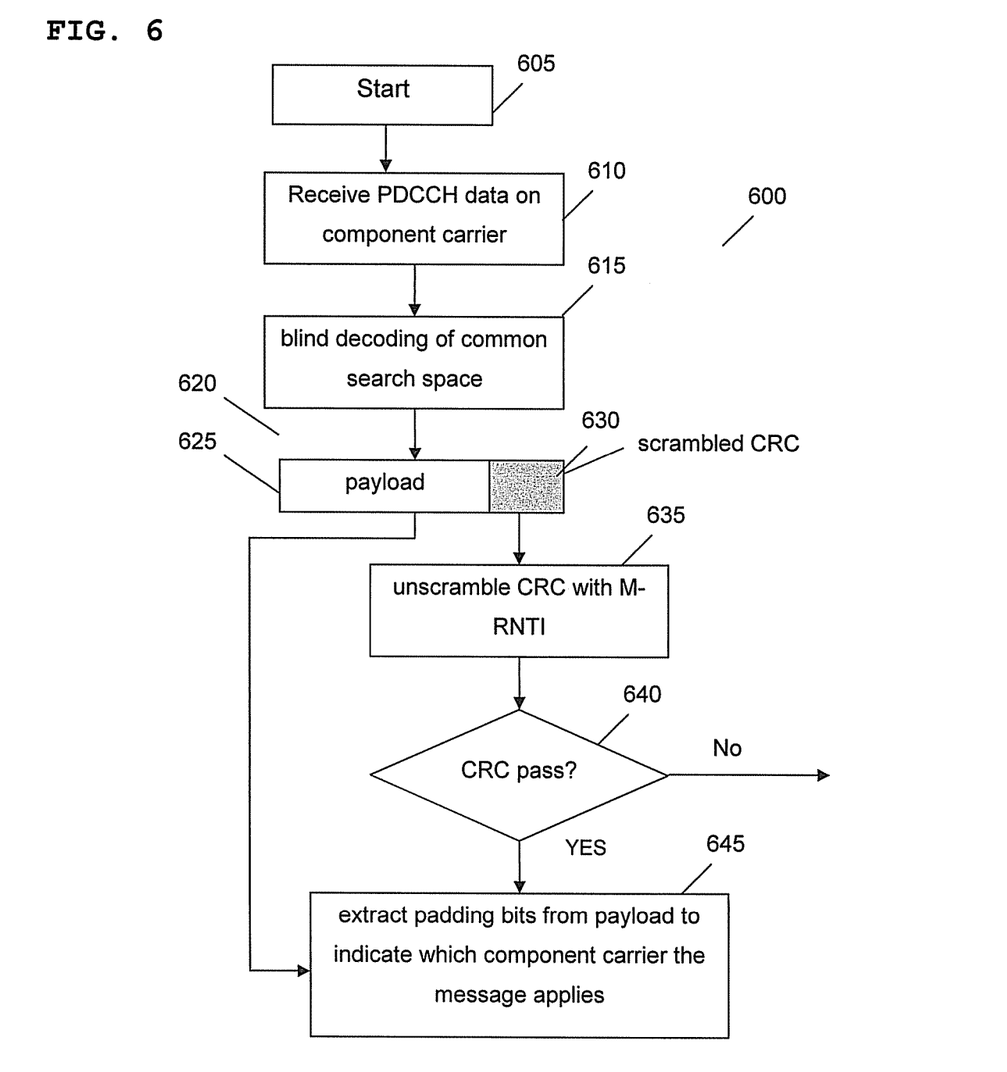
FIG. 6 illustrates a further example of a flowchart employed at an user equipment to support cross carrier scheduling for broadcast communications in accordance with some example embodiments of the invention.

Referring now to FIG. 6, an example of a flowchart 600 to support a UE operation in accordance with the third example embodiment is illustrated. The UE operations start at step 605 and move on to step 610 where the UE receives PDCCH data on a component carrier. The UE then performs blind decoding of downlink control information in a common search space, as shown in step 615. The UE's blind decoding produces a received data packet(s) 620 comprising a data payload 625 and a CRC value 630 that can be unscrambled. The UE then unscrambles the cyclic redundancy check (CRC) of the PDCCH data with the broadcast service identifier (e.g. M-RNTI), as shown in step 635. The UE than determines whether (or not) the CRC contains all zeros, as shown in step 640. If the UE determines that the CRC does not pass then no resulting action is taken. If the UE determines that the CRC passes, in step 640, the UE extracts the padding bits from the payload, according to Table 3, and using a higher layer signalled mapping is able to determine to which component carrier the message applies, as shown in step 650.

Figure 7:
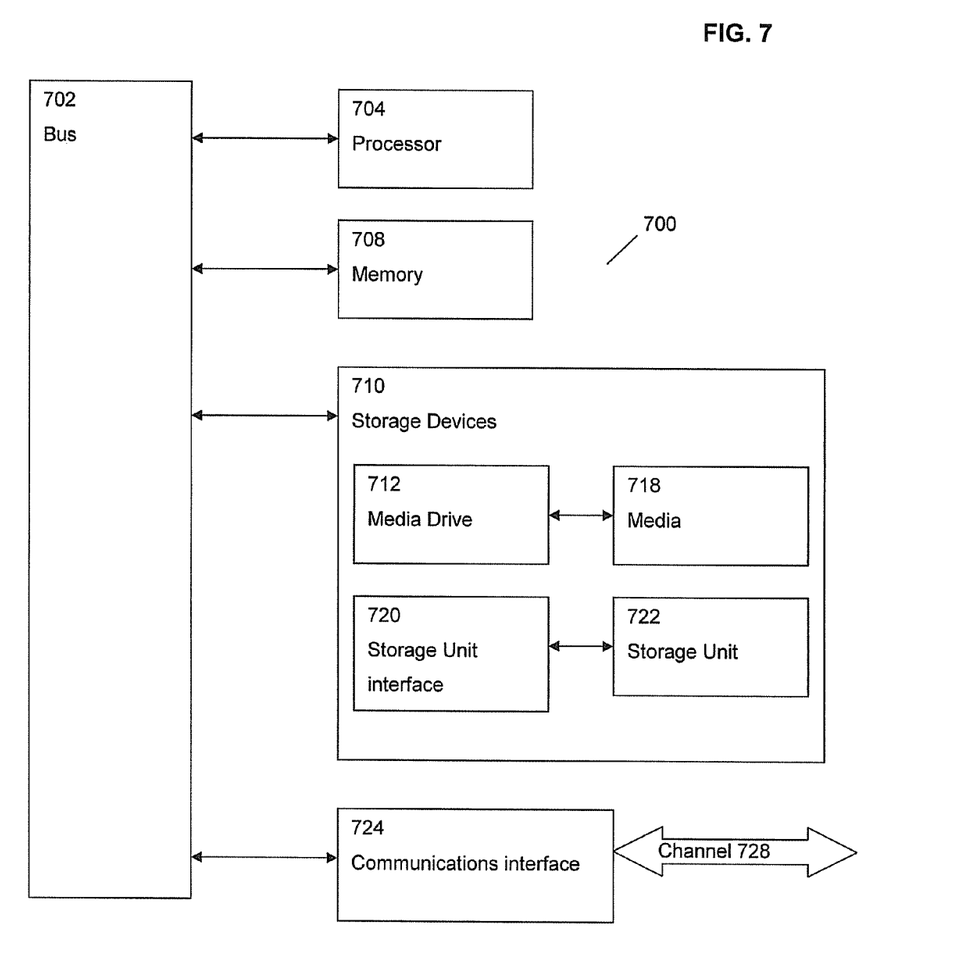
FIG. 7 illustrates a typical computing system that may be employed to implement signal processing functionality in embodiments of the invention.

Referring now to FIG. 7, there is illustrated a typical computing system 700 that may be employed to implement signal processing functionality in embodiments of the invention. Computing systems of this type may be used in access points and wireless communication units. Those skilled in the relevant art will also recognize how to implement the invention using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special-purpose processing engine such as, for example, a microprocessor, microcontroller or other control logic. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 718 may include, for example, a hard disk, floppy disk, magnetic tape, optical disk, CD or DVD, or other fixed or removable medium that is read by and written to by media drive 712. As these examples illustrate, the storage media 718 may include a computer-readable storage medium having particular computer software or data stored therein.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a universal serial bus (USB) port), a PCMCIA slot and card, etc. Software and data transferred via communications interface 724 are in the form of signals which can be electronic, electromagnetic, and optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as 'computer program code' (which may be grouped in the form of computer programs or other groupings), when executed, enable the computing system 700 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 722, drive 712 or communications interface 724. The control logic (in this example, software instructions or computer program code), when executed by the processor 704, causes the processor 704 to perform the functions of the invention as described herein.

In one example, a tangible non-transitory computer program product comprises executable program code for supporting cross carrier indication of a control channel change notification for at least one wireless communication unit that is operating on a first serving communication cell and has been configured with access to at least one second cell in a wireless broadcast communication system. The executable program code is operable for, when executed at the base station 110, generating a message comprising a broadcast service identifier (e.g. M-RNTI), wherein the broadcast service identifier identifies a control channel change of at least one second serving communication cell accessible by the at least one wireless communication unit; and transmitting the message to the at least one wireless communication unit.

In one example, a tangible non-transitory computer program product comprises executable program code for supporting cross carrier indication of a control channel change notification for a wireless communication unit 125 that is operating on a first communication serving cell and has access to at least one second serving communication cell in a wireless broadcast communication system. The executable program code is operable for, when executed at the wireless communication unit 125: receiving a message on the first serving communication cell; decoding the message to recover a broadcast service identifier (e.g. M-RNTI), wherein the broadcast service identifier identifies a control channel change of at least one second serving communication cell accessible by the at least one wireless communication unit; and transferring to the at least one second serving communication cell in response to the decoded message.

It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality. For example, for clarity the signal processing module 208, 408 has been illustrated and described as a single processing module, whereas in other implementations it may comprise separate processing modules or logic blocks.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second", etc. do not preclude a plurality.

The invention claimed is:

1. A method for supporting cross carrier indication of a control channel change notification for at least one wireless communication unit operating on a first serving communication cell, the at least one wireless communication unit configured with access to a plurality of second serving communication cells in a wireless broadcast communication system, the method comprising:

generating, at a base station of the wireless broadcast communication system, a message comprising a broadcast service identifier, the broadcast service identifier identifying an upcoming control channel change of a particular second serving communication cell of the plurality of second serving communication cells accessible by the at least one wireless communication unit, the broadcast service identifier being unique to the particular second serving communication cell and the broadcast service identifier being different from a first broadcast service identifier associated with the first serving communication cell and each of a plurality of broadcast service identifiers corresponding to the remaining second serving communication cells of the plurality of second serving communication cells; and transmitting the message to the at least one wireless communication unit, wherein the wireless broadcast communication system supports a long term evolved (LTE) multicast broadcast multimedia service (MBMS), each the plurality of broadcast service identifiers is mapped to a corresponding second serving communication cell of the plurality of second serving communication cells according to higher layers of an LTE protocol stack, and the plurality of second serving communication cells are separately ordered for each wireless communication unit of the at least one wireless communication unit.

2. The method of claim 1, wherein said generating the message includes selecting said broadcast service identifier from the plurality of broadcast service identifiers.

3. The method of claim 1, further comprising:

determining, by the base station, the particular second serving communication cell to identify with said broadcast service identifier; and scrambling the first broadcast service identifier associated with the first serving communication cell based on the determined second serving communication cell to produce a second broadcast service identifier as said broadcast service identifier that identifies the upcoming control channel change of said particular second serving communication cell accessible by the at least one wireless communication unit.

4. The method of claim 3, wherein said scrambling the first broadcast service identifier based on the determined second serving communication cell includes scrambling the first broadcast service identifier with a set of pre-defined scrambling sequences.

5. The method of claim 3, wherein the second broadcast service identifier is produced by validating that the second broadcast service identifier does not coincide with an existing broadcast service identifier.

6. The method of claim 1, wherein said generating the message includes using the broadcast service identifier to scramble a cyclic redundancy check (CRC) of a DCI format 1C message that identifies the upcoming control channel change of said particular second serving communication cell accessible by the at least one wireless communication unit.

7. The method of claim 6, wherein said generating using the DCI format 1C message using the broadcast service identifier includes utilizing a number of padding bits such that a bit pattern of the padding bits identifies a resource change of said particular second serving communication cell accessible by the at least one wireless communication unit.

8. The method of claim 1, further comprising adding a second serving communication cell to a list of the plurality of second serving communication cells using signaling corresponding to the higher layers of the LTE protocol stack.

9. The method of claim 8, further comprising assigning, by the signaling, a cell index reference of the added second serving communication cell for use in subsequent signaling.

10. The method of claim 1, wherein the control channel change notification is a MBMS control channel (MCCH) change notification.

11. The method of claim 1, wherein the broadcast service identifier is a MBMS radio network temporary identifier.

12. A base station for supporting cross carrier indication of a control channel change notification for at least one wireless communication unit operating on a first serving communication cell, the at least one wireless communication unit configured with access to a plurality of second serving communication cells in a wireless broadcast communication system, the base station comprising:

circuitry configured to generate a message comprising a broadcast service identifier, the broadcast service identifier identifying an upcoming control channel change of a particular second serving communication cell of the plurality of second serving communication cells accessible by the at least one wireless communication unit, the broadcast service identifier being unique to the particular second serving communication cell and the broadcast service identifier being different from a first broadcast service identifier associated with the first serving communication cell and each of a plurality of broadcast service identifiers corresponding to the remaining second serving communication cells of the plurality of second serving communication cells; and transmit the message to the at least one wireless communication unit, wherein
the wireless broadcast communication system supports a long term evolved (LTE) multicast broadcast multimedia service (MBMS),
the circuitry maps each the plurality of broadcast service identifiers to a corresponding second serving communication cell of the plurality of second serving communication cells according to higher layers of an LTE protocol stack, and
the circuitry separately orders the plurality of second serving communication cells for each wireless communication unit of the at least one wireless communication unit.

13. An integrated circuit for a base station to support cross carrier indication of a control channel change notification for at least one wireless communication unit that is operating on a first serving communication cell, the at least one wireless communication circuit configured with access to a plurality of second serving communication cells in a wireless broadcast communication system, the integrated circuit comprising:
signal processing logic configured to generate a message comprising a broadcast service identifier, wherein
the broadcast service identifier identifies an upcoming control channel change of a particular second serving communication cell of the plurality of second serving communication cells accessible by the at least one wireless communication unit for transmitting the message, the broadcast service identifier being unique to the particular second serving communication cell and the broadcast service identifier being different from a first broadcast service identifier associated with the first serving communication cell and each of a plurality of broadcast service identifiers corresponding to the remaining second serving communication cells of the plurality of second serving communication cells,
the wireless broadcast communication system supports a long term evolved (LTE) multicast broadcast multimedia service (MBMS),
the signal processing logic maps each the plurality of broadcast service identifiers to a corresponding second serving communication cell of the plurality of second serving communication cells according to higher layers of an LTE protocol stack, and
the signal processing logic separately orders the plurality of second serving communication cells for each wireless communication unit of the at least one wireless communication unit.

14. A method for supporting cross carrier indication of a control channel change notification for a wireless communication unit that is operating on a first serving communication cell, the wireless communication unit configured with access to a plurality of second serving communication cells in a wireless broadcast communication system, the method comprising:
receiving, by the wireless communication unit, a message;
decoding, by the wireless communication unit, the message to recover a broadcast service identifier, the broadcast service identifier identifying an upcoming control channel change of a particular second serving communication cell of the plurality of second serving communication cells accessible by the one wireless communication unit and being unique to the particular second serving communication cell and the broadcast service identifier being different from a first broadcast service identifier associated with the first serving communication cell and each of a plurality of broadcast service identifiers corresponding to the remaining second serving communication cells of the plurality of second serving communication cells; and
transferring to said particular second serving communication cell based on the decoded message, wherein
the wireless broadcast communication system supports a long term evolved (LTE) multicast broadcast multimedia service (MBMS),
each the plurality of broadcast service identifiers is mapped to a corresponding second serving communication cell of the plurality of second serving communication cells according to higher layers of an LTE protocol stack, and
the plurality of second serving communication cells are ordered for the wireless communication unit.

15. The method of claim 14, wherein said decoding the message includes identifying said broadcast service identifier from the plurality of unique broadcast service identifiers.

16. The method of claim 14, wherein said decoding the message includes de-scrambling the first broadcast service identifier scrambled based on said particular second serving communication cell to produce a second broadcast service identifier that identifies the control channel change of said particular second serving communication cell.

17. The method of claim 16, wherein said de-scrambling the first broadcast service identifier includes de-scrambling the first broadcast service identifier with a set of pre-defined scrambling sequences to distinguish between identification of the plurality of second serving communication cells.

18. The method of claim 14, wherein said decoding the message includes using the broadcast service identifier to decode a DCI format 1C message that identifies the upcoming control channel change of said particular second serving communication cell accessible by the one wireless communication unit.

19. The method of claim 18, wherein said decoding using the DCI format 1C message using the broadcast service identifier includes determining a bit pattern of padding bits in the DCI format 1C message such that a bit pattern identifies the upcoming control channel change of said particular second serving communication cell accessible by the one wireless communication unit.

20. The method of claim 14, wherein the control channel change notification is a MBMS control channel (MCCH) change notification.

21. The method of claim 14, wherein the broadcast service identifier is a MBMS radio network temporary identifier.

22. A wireless communication unit for supporting cross carrier indication of a control channel change notification for the wireless communication unit, the wireless communication unit operating on a first serving communication cell and the wireless communication unit configured with access to a plurality of second serving communication cells in a wireless broadcast communication system, the wireless communication unit comprising:
circuitry configured to:
receive a message;
decode the message to recover a broadcast service identifier, the broadcast service identifier identifying an upcoming control channel change of a particular second serving communication cell of the plurality of second serving communication cells accessible by the one wireless communication unit and being unique to the particular second serving communication cell and the broadcast service identifier being different from a first broadcast service identifier associated with the first serving communication cell and each of a plurality of broadcast service identifiers corresponding to the remaining second serving communication cells of the plurality of second serving communication cells; and transfer to said particular second serving communication cell based on the decoded message, wherein the wireless broadcast communication system supports a long term evolved (LTE) multicast broadcast multimedia service (MBMS);

each the plurality of broadcast service identifiers is mapped to a corresponding second serving communication cell of the plurality of second serving communication cells according to higher layers of an LTE protocol stack, and the plurality of second serving communication cells are ordered for the wireless communication unit.

23. An integrated circuit for a wireless communication unit to support cross carrier indication of a control channel change notification for the wireless communication unit, the wireless communication unit operating on a first serving communication cell and the wireless communication unit configured with access to a plurality of second serving communication cells in a wireless broadcast communication system, the integrated circuit comprising:

a signal processing logic configured to:
  receive a message;
  decode the message to recover a broadcast service identifier, the broadcast service identifier identifying an upcoming control channel change of a particular second serving communication cell of the plurality of second serving communication cells accessible by the one wireless communication unit and being unique to the particular second serving communication cell and the broadcast service identifier being different from a first broadcast service identifier associated with the first serving communication cell and each of a plurality of broadcast service identifiers corresponding to the remaining second serving communication cells of the plurality of second serving communication cells; and
  transfer to said particular second serving communication cell based on the decoded message, wherein the wireless broadcast communication system supports a long term evolved (LTE) multicast broadcast multimedia service (MBMS), each the plurality of broadcast service identifiers is mapped to a corresponding second serving communication cell of the plurality of second serving communication cells according to higher layers of an LTE protocol stack, and the plurality of second serving communication cells are ordered for the signal processing logic.

24. A wireless broadcast communication system, comprising:

a base station that supports cross carrier indication of a control channel change notification for a wireless communication unit operating on a first serving communication cell, the wireless communication unit configured with access to a plurality of second serving communication cells in the wireless broadcast communication system; and the wireless communication unit, wherein the base station includes first circuitry configured to:
  generate a message comprising a broadcast service identifier, the broadcast service identifier identifying an upcoming control channel change of a particular second serving communication cell of the plurality of second serving communication cells accessible by the wireless communication unit, the broadcast service identifier being unique to the particular second serving communication cell and the broadcast service identifier being different from a first broadcast service identifier associated with the first serving communication cell and all other each of a plurality of broadcast service identifiers corresponding to the remaining second serving communication cells of the plurality of second serving communication cells; and
  transmit the message to the wireless communication unit, and the wireless communication unit includes second circuitry configured to:
  receive the message;
  decode the message to recover the broadcast service identifier, the broadcast service identifier identifying the upcoming control channel change of said particular second serving communication cell accessible by the wireless communication unit; and
  transfer to said particular second serving communication cell based on the decoded message.

* * * * *